United States Patent
Ito (10) Patent No.: US 9,584,677 B2
(45) Date of Patent: Feb. 28, 2017

(54) IMAGE FORMING APPARATUS (71) Applicant: KYOCERA Document Solutions Inc., Osaka (JP)

(72) Inventor: Shigeharu Ito, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/978,589

(22) Filed: Dec. 22, 2015

(65) Prior Publication Data

US 2016/0188269 A1   Jun. 30, 2016

(30) Foreign Application Priority Data

Dec. 25, 2014   (JP) ................................. 2014-262514

(51) Int. Cl.
H04N 1/04 (2006.01)
H04N 1/00 (2006.01)
G06F 3/12 (2006.01)

(52) U.S. Cl.
CPC .......... H04N 1/00204 (2013.01); G06F 3/126 (2013.01); G06F 3/1212 (2013.01); G06F 3/1285 (2013.01)

(58) Field of Classification Search
CPC .................................................. H04N 1/00204
USPC ................................ 358/1.13, 1.9, 1.14, 1.15
See application file for complete search history.

(56) References Cited

FOREIGN PATENT DOCUMENTS

| JP | 2001142268 A | | 5/2001 | |
| JP | 2006-251060 | * | 9/2006 | ............ G03G 21/14 |
| JP | 2006251060 A | | 9/2006 | |
| JP | 2011133716 A | | 7/2011 | |
| JP | 2011-193138 A | | 9/2011 | |
| WO | 2009008065 A | | 1/2009 | |

OTHER PUBLICATIONS

Notice of Reasons for Refusal mailed by Japan Patent Office on Jul. 12, 2016 in the corresponding Japanese patent application No. 2014-262514.

* cited by examiner

*Primary Examiner* — Houshang Safaipour
(74) *Attorney, Agent, or Firm* — IP Business Solutions, LLC (57) ABSTRACT

An image forming apparatus includes a printing section, an operation control section, a post-processing section, and a delay time calculating section. The operation control section is configured to control an operation of the printing section. The post-processing section is configured to perform post-processing of a recording paper sheet subjected to printing by the printing section. The delay time calculating section is configured to calculate a delay time in a printing process to be generated by the post-processing performed by the post-processing section. When the delay time calculated by the delay time calculating section is equal to or longer than a predetermined first time period, the operation control section controls the printing section to perform a printing operation at a predetermined printing speed higher than a normal printing speed.

10 Claims, 5 Drawing Sheets

| JOB CONTENTS | PRINTING SPEED | DELAY TIME |
|---|---|---|
| JOB1 (PRINTING ON 50 SHEETS PLUS STAPLING OF 5 SETS OF SHEETS) | 60 SHEETS/MIN | 1.7 × 5=8.5 SECONDS |
| JOB2 (PRINTING ON 30 SHEETS) | 80 SHEETS/MIN | 8.5−0.25 × 30=1.0 SECONDS |
| JOB3 (PRINTING ON 20 SHEETS) | 80 SHEETS/MIN | 1.0−0.25 × 20=−4.0 SECONDS |
| JOB4 (PRINTING ON 20 SHEETS PLUS STAPLING OF 3 SETS OF SHEETS) | 60 SHEETS/MIN | −4.0+1.7 × 3=1.1 SECONDS |
| JOB5 (PRINTING ON 15 SHEETS) | 60 SHEETS/MIN | 1.1 SECONDS |

IMAGE FORMING APPARATUS

INCORPORATION BY REFERENCE

This application claims priority to Japanese Patent Application No. 2014-262514 filed on Dec. 25, 2014, the entire disclosure of which is incorporated herein by reference.

BACKGROUND

The present disclosure relates to image forming apparatuses and particularly relates to a technique for changing the printing speed.

There have emerged image forming apparatuses with so-called post-processing sections. In such an image forming apparatus, a printed recording paper sheet can be subjected to post-processing, such as stapling.

When any post-processing, such as stapling, is performed, the interval between recording paper sheets being fed needs to be made longer than when no post-processing is performed, which generates a delay time in a printing process. Once such a delay time is generated in one print job, the delay time will be reproduced in subsequent print jobs.

SUMMARY

A technique improved over the aforementioned technique is proposed as one aspect of the present disclosure.

An image forming apparatus according to an aspect of the present disclosure includes a printing section and a control unit. The control unit implements an operation control section, a post-processing section, and a delay time calculating section.

The operation control section is configured to control an operation of the printing section.

The post-processing section is configured to perform post-processing of a recording paper sheet subjected to printing by the printing section.

The delay time calculating section is configured to calculate a delay time in a printing process to be generated by the post-processing performed by the post-processing section.

When the delay time calculated by the delay time calculating section is equal to or longer than a predetermined first time period, the operation control section controls the printing section to perform a printing operation at a predetermined printing speed higher than a normal printing speed.

DETAILED DESCRIPTION

Hereinafter, a description will be given of an image forming apparatus according to one embodiment of the present disclosure with reference to the drawings.

Figure 1:
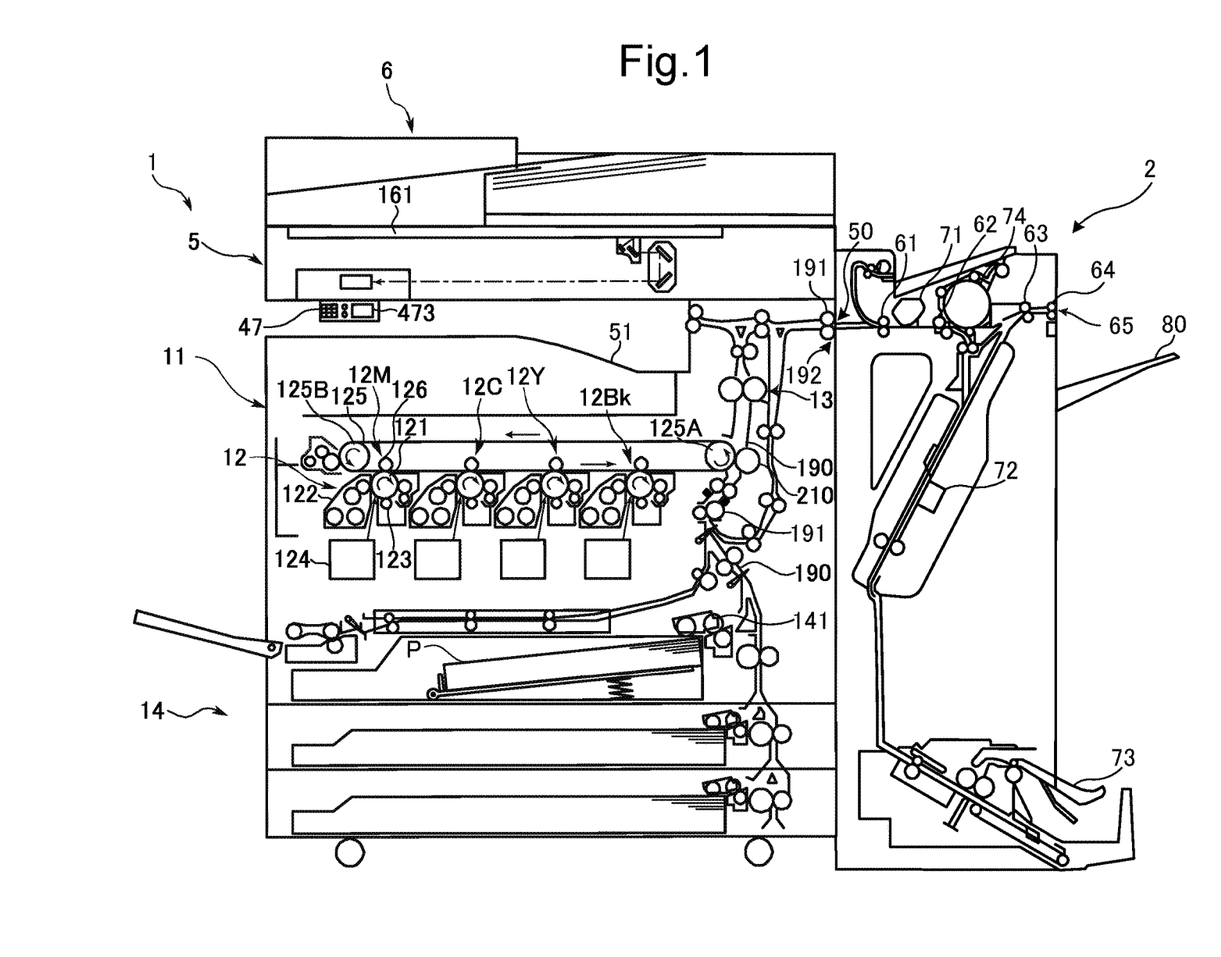
FIG. 1 is a front cross-sectional view showing the structure of an image forming apparatus according to one embodiment of the present disclosure.

FIG. 1 is a front cross-sectional view showing the structure of an image forming apparatus according to one embodiment of the present disclosure.

The image forming apparatus 1 is a multifunction peripheral having multiple functions including, for example, a copy function, a print function, a scan function, and a facsimile function. The image forming apparatus 1 is made up so that an apparatus body 11 thereof includes an operating section 47, an image forming section 12, a fixing section 13, a sheet feed section 14, a document feed section 6, a document reading section 5, and so on.

In a document reading operation of the image forming apparatus 1, the document reading section 5 optically reads an image of an original document being fed by the document feed section 6 or an image of an original document placed on an original glass plate 161 to generate image data. The image data generated by the document reading section 5 is stored on an internal HDD, a network-connected computer or the like.

In an image forming operation of the image forming apparatus 1, the image forming section 12 forms a toner image on a recording paper sheet P serving as a recording medium fed from the sheet feed section 14 by a sheet feed roller 141, based on image data generated by the document reading operation, image data stored on the internal HDD, or other image data. Each of image forming units 12M, 12C, 12Y, and 12Bk of the image forming section 12 includes a photosensitive drum 121, a charging device 123, an exposure device 124, a developing device 122, and a primary transfer roller 126.

Each of the developing devices 122 of image forming units 12M, 12C, 12Y, and 12Bk holds a toner for use in developing an electrostatic latent image. The developing device 122 is configured to supply the toner to the surface of the photosensitive drum 121 which has been charged by the charging device 123 and exposed to light by the exposure device 124.

In performing color printing, the image forming unit 12M for magenta, the image forming unit 12C for cyan, the image forming unit 12Y for yellow, and the image forming unit 12Bk for black in the image forming section 12 form respective toner images on their respective photosensitive drums 121 through charging, exposure, and developing processes based on respective images of respective different color components constituting the image data and then allow their respective primary transfer rollers 126 to transfer the toner images to an intermediate transfer belt 125 mounted around a drive roller 125A and a driven roller 125B.

The intermediate transfer belt 125 has an outer peripheral surface set as an image carrying surface to which a toner image is to be transferred, and is configured to be driven by the drive roller 125A while engaging against the peripheral surfaces of the photosensitive drums 121. The intermediate transfer belt 125 is configured to travel in an endless path between the drive roller 125A and the driven roller 125B while synchronizing with each photosensitive drum 121.

The toner images of different colors transferred to the intermediate transfer belt 125 are superposed each other on the intermediate transfer belt 125 by controlling their transfer timings, resulting in a multicolor toner image. A secondary transfer roller 210 is configured to transfer the multicolor toner image formed on the surface of the intermediate transfer belt 125, at a nip between the secondary transfer roller 210 and the drive roller 125A with the intermediate transfer belt 125 in between, to a recording paper sheet P conveyed from the sheet feed section 14 along a conveyance path 190 by conveyance roller pairs 191 provided at appropriate locations in the conveyance path 190. Thereafter, the fixing section 13 fixes the toner image on the recording paper sheet P by the application of heat and pressure using a fixing roller unit including a heat roller and a pressure roller. The recording paper sheet P having a multicolor image fixed thereon by the completion of the fixation treatment is discharged to a sheet output tray 51.

The image forming apparatus 1 further includes a post-processing section 2 configured to perform post-processing of the recording paper sheet P on which an image has been formed.

The post-processing section 2 is connected to the apparatus body 11 of the image forming apparatus 1 to receive through a sheet receiving port 50 the recording paper sheet P having an image formed thereon and having been discharged through a discharge port 192 of the image forming apparatus 1.

The recording paper sheet P fed through the sheet receiving port 50 to the post-processing section 2 is conveyed by conveyance roller pairs 61, 62, 63. The conveyed recording paper sheet P is subjected, at a predetermined position in the post-processing section 2, to post-processing by a punching section 71, a stapling section 72, a booklet forming section 73 or so on. When the post-processing will not keep up with the conveyance of a recording paper sheet P, the recording paper sheet P is allowed to temporarily escape to an escape drum 74. The post-processed recording paper sheet P is discharged through an output port 65 by an output roller pair 64. A collection tray 80 is provided below the output port 65. Recording paper sheets P discharged through the output port 65 are deposited on the collection tray 80.

Figure 2:
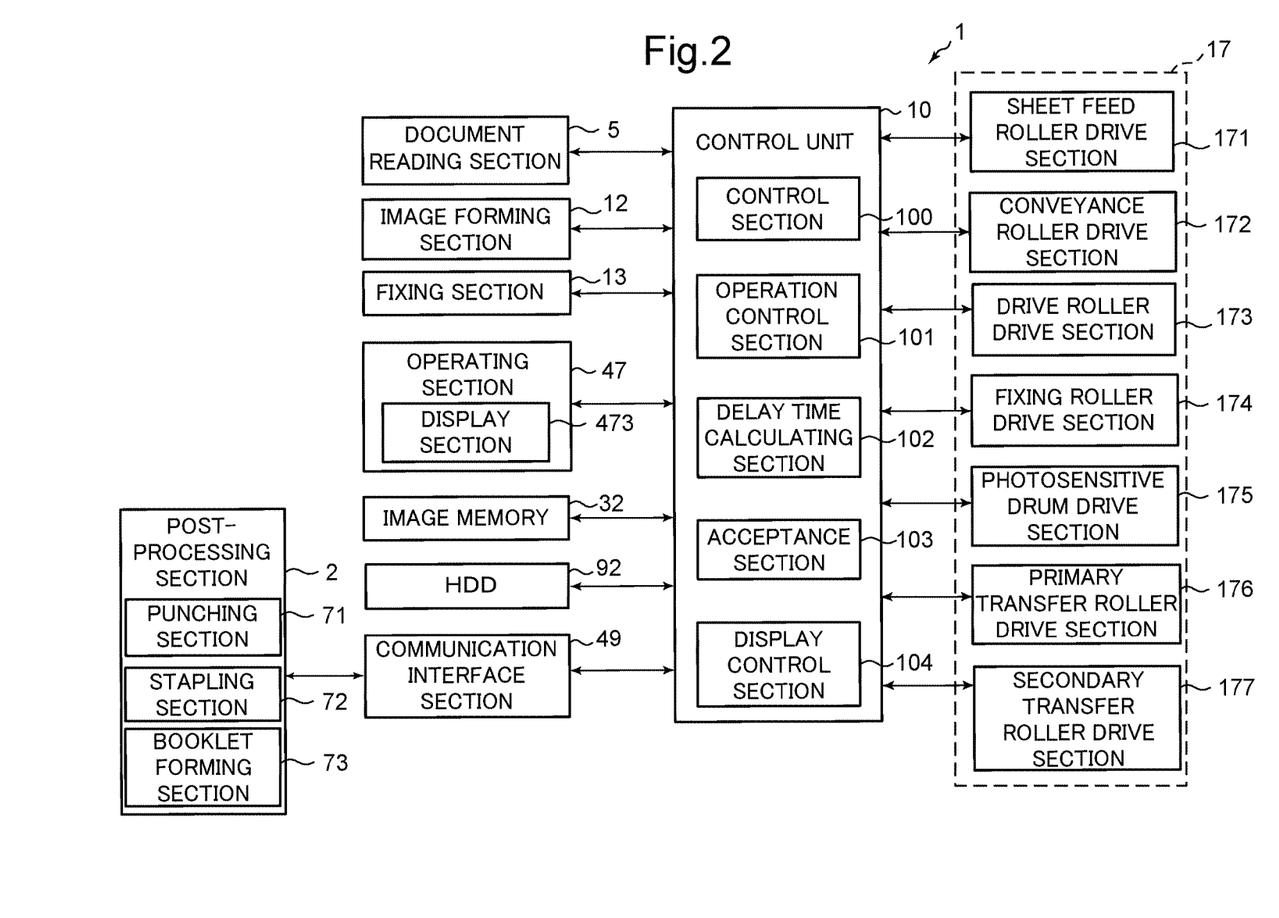
FIG. 2 is a block diagram schematically showing an essential internal configuration of the image forming apparatus according to the one embodiment of the present disclosure.

Next, a description will be given of an electrical configuration of the image forming apparatus 1. FIG. 2 is a functional block diagram schematically showing an essential internal configuration of the image forming apparatus 1.

The image forming apparatus 1 includes, in addition to the previously described document reading section 5, image forming section 12, fixing section 13, post-processing section 2, and so on, an operating section 47, an image memory 32, an HDD (hard disk drive) 92, a communication interface section 49, a control unit 10, a drive unit 17, and so on.

The operating section 47 includes a touch panel section and an operating key section which are configured to accept user's instructions for various types of operations and processing executable by the image forming apparatus 1. The touch panel section is made up by including a display section 473, such as an LCD (liquid crystal display) equipped with a touch panel.

The image memory 32 provides a region for temporarily storing data of image of an original document read by the document reading section 5 and temporarily storing data to be printed by the image forming section 12.

The HDD 92 is a large storage device capable of storing document images and so on read by the document reading section 5.

The communication interface section 49 includes a communication device for serial communications or so on. The image forming apparatus 1 is configured to send various instructions and requests through the communication interface section 49 to the post-processing section 2 and receive various notices through the communication interface section 49 from the post-processing section 2.

The control unit 10 is composed of a processor, a CPU (central processing unit), a RAM (random access memory), a ROM (read only memory), and so on. An image forming apparatus control program stored in the aforementioned ROM of the control unit 100 or the HDD 92 is executed by the aforementioned CPU, so that the control unit 10 functions as a control section 100, an operation control section 101, a delay time calculating section 102, an acceptance section 103, and a display control section 104. Alternatively, each of the control section 100, the operation control section 101, the delay time calculating section 102, the acceptance section 103, and the display control section 104 of the control unit 10 may not be implemented by the operation of the control unit 10 in accordance with the image forming apparatus control program but may be constituted by a hardware circuit.

The control section 100 governs the overall control of the image forming apparatus 1.

The display control section 104 has the function of controlling the display operation of the display section 473 and is thus configured to allow the display section 473 to display a predetermined operating screen and so on.

The acceptance section 103 has the function of accepting, based on a user's operation entered using the touch panel section or the operating key section of the operating section 47 according to the operating screen or so on displayed on the display section 473, jobs and so on relating to processing executable on the image forming apparatus 1.

The operation control section 101 is connected to a printing section which includes the image forming section 12, the fixing section 13, and the drive unit 17 composed of a plurality of drive sections 171 to 177 each including a stepping motor, a gear, and so on. The operation control section 101 has the function of controlling the printing operation of the printing section.

The printing section is configured to be capable of changing the printing speed (PPM (page per minute)) under the control of the operation control section 101. The operation control section 101 can change the printing speed by allowing the printing section to change its processing speed in the printing operation. Specifically, the operation control section 101 allows the printing section to change the processing speed in the printing operation by controlling a photosensitive drum drive section 175 to change the peripheral speed of the photosensitive drum 121 or controlling the conveyance roller drive section 172 to change the speed of conveyance of the recording paper sheet P.

The upper limit of the printing speed depends upon the limits of performances of the mechanisms constituting the printing section of the image forming apparatus 1 (such as the development performance of the developing device 122, the fixation performance of the fixing section 13, and the conveyance performance of the conveyance roller pairs 191). However, as the printing speed increases, the rate at which each mechanism of the printing section deteriorates owing to wear and so on also increases. Furthermore, as the printing speed increases, the power and operating sound involved in operating each mechanism also increase. Therefore, in shipping the image forming apparatus 1 as a product, the image forming apparatus 1 is set to operate not at the upper limit but at a printing speed lower than the upper limit in consideration of the product life, power consumption, and so on. This setting is stored in a region of the HDD 92 inaccessible by general users. The operation control section 101 reads the setting stored in the HDD 92 and controls the printing section including the image forming section 12, the fixing section 13, and the drive unit 17 so that printing is made at the printing speed indicated by the setting.

Alternatively, the operation control section 101 may change the printing speed not by changing the processing speed in the printing operation but by controlling a sheet feed roller drive section 171, the conveyance roller drive section 172 or so on to allow the printing section to change the interval between recording paper sheets P being fed in a continuous printing operation.

The operation control section 101 also has the function of controlling the post-processing operation of the post-processing section 2. For example, in order to secure a time taken for post-processing of the punching section 71, the stapling section 72, the booklet forming section 73 or so on, the operation control section 101 controls the sheet feed roller drive section 171, the conveyance roller drive section 172, the conveyance roller pairs 61, 62, 63, the escape drum 74 or so on to make the interval between recording paper sheets P being fed in a printing operation including post-processing longer than in a printing operation including no post-processing. As a result, in the printing operation including post-processing, a delay time in the printing process is generated relative to the printing operation including no post-processing.

The delay time calculating section 102 has the function of calculating the above delay time to be generated by the post-processing performed by the post-processing section 2. Specifically, the delay time calculating section 102 calculates the delay time to be generated in one cycle of post-processing by subtracting the time of interval [T2] between recording paper sheets P being fed in a printing operation including no post-processing from the time of interval [T1] between recording paper sheets P being fed in a printing operation including post-processing, i.e., [T1−T2]. Then, the delay time calculating section 102 calculates the delay time [Ta] to be generated by a print job including the post-processing by multiplying the delay time [T1−T2] to be generated in the one cycle of post-processing by the number of cycles of post-processing [N] indicated by the print job.

The operation control section 101 determines whether to change the printing speed of the printing section based on the above delay time calculated by the delay time calculating section 102. In a normal operation, the operation control section 101 controls the printing section to perform the printing operation at a predetermined normal printing speed [V1]. When the delay time [Ta] calculated by the delay time calculating section 102 becomes equal to or longer than a predetermined first time period [Tb], i.e., [Ta≥Tb], the operation control section 101 controls the printing section to perform the printing operation at a printing speed [V2] higher than the normal printing speed [V1]. In other words, in order to eliminate the delay time, the printing speed is put ahead of the product life, the power consumption, and so on.

When the operation control section 101 controls the printing section to perform the printing operation at the printing speed [V2] higher than the normal printing speed [V1], the delay time calculating section 102 calculates a shortened time [Tc] in the printing process to be generated by the control. The delay time calculating section 102 further calculates a time period [Ta−Tc] by subtracting the shortened time [Tc] from the delay time [Ta].

When the time period [Ta−Tc] calculated by the delay time calculating section 102 becomes equal to or shorter than a predetermined second time period [Td], i.e., [(Ta−Tc)≤Td], the operation control section 101 stops controlling the printing section to perform the printing operation at the printing speed [V2] higher than the normal printing speed [V1] and allows the printing section to perform the printing operation at the normal printing speed [V1]. In other words, because the delay time has been eliminated, the printing section is returned to the normal printing speed to put the product life, the power consumption, and so on ahead of the printing speed.

A description will hereinafter be given of processing of the operation control section 101 and the delay time calculating section 102 with a specific example.

If the speed at which A4 recording paper sheets P are subjected to printing in the normal operation of the image forming apparatus 1 is 60[sheets/min] (60 sheets can be printed per minute) and the speed at which A4 recording paper sheets P are conveyed in the normal operation is 300 [mm/sec], the time of interval between A4 recording paper sheets P being fed in the normal operation can be calculated by the following equation:

$$60[\text{sec}]/60[\text{sheets}]-210[\text{mm}]/300[\text{mm/sec}]=0.3[\text{sec}].$$

Suppose that a time of interval of 2.0 [sec] between recording paper sheets P being fed is necessary for the post-processing section 2 to perform stapling. The difference between the time of interval between recording paper sheets P being fed in a printing operation including stapling and the time of interval between recording paper sheets P being fed in a printing operation not including stapling is 2.0 [sec]−0.3 [sec]=1.7 [sec]. Therefore, the delay time calculating section 102 adds 1.7 [sec] to the delay time each time the operation control section 101 allows the post-processing section 2 to perform one cycle of stapling.

Figure 3:
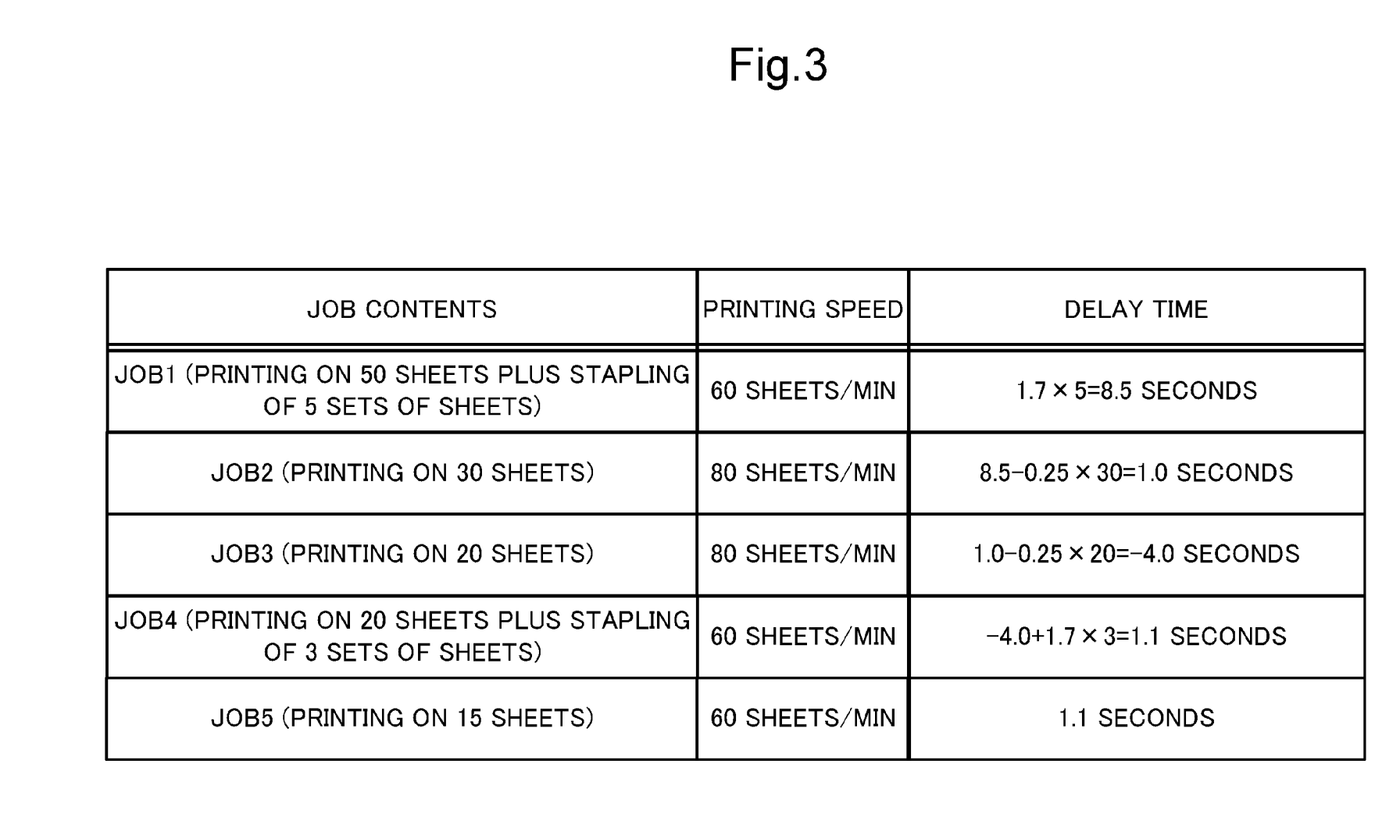
FIG. 3 is a table showing examples of printing speeds and delay times generated in various print jobs on the image forming apparatus according to the one embodiment of the present disclosure.

In an example shown in FIG. 3, because a print job JOB1 is a print job including stapling of five sets of sheets, the delay time to be generated in the print job JOB1 is 1.7 [sec]×5=8.5 [sec].

If the predetermined first time period [Tb] is 2.0 [sec], the delay time to be generated in the print job JOB1 is longer than the first time period [Tb]. Therefore, the operation control section 101 sets the printing speed in the next print job JOB2 at a printing speed of 80 [sheets/min] higher than the normal printing speed of 60 [sheets/min].

If printing is performed at the normal printing speed of 60 [sheets/min], the time taken to print one recording paper sheet P is 60 [sec]/60 [sheets]=1 [sec]. On the other hand, when printing is performed at a printing speed of 80 [sheets/min], the time taken to print one recording paper sheet P is 60 [sec]/80 [sheets]=0.75 [sec]. Therefore, when printing is performed at a printing speed of 80 [sheets/min], a shortened time of (1 [sec]−0.75 [sec]=0.25 [sec]) is generated each time one recording paper sheet P is subjected to printing, relative to the case where printing is performed at the normal printing speed of 60 [sheets/min]. The delay time calculating section 102 subtracts 0.25 [sec] from the delay time each time the operation control section 101 allows the printing section to print on one recording paper sheet P.

In the example shown in FIG. 3, because the print job JOB2 is a print job including printing on 30 recording paper sheets P, the shortened time to be generated in the print job JOB2 is 0.25 [sec]×30=7.5 [sec]. As a result, the delay time at the end of the print job JOB2 is 8.5 [sec]−7.5 [sec]=1.0 [sec].

If the predetermined second time period [Td] is 0.5 [sec], the delay time at the end of the print job JOB2 is neither equal to nor shorter than the second time period [Td]. Therefore, the operation control section 101 maintains the printing speed in the next print job JOB3 at the printing speed of 80 [sheets/min].

In the example shown in FIG. 3, because the print job JOB3 is a print job including printing on 20 recording paper sheets P, the shortened time to be generated in the print job JOB3 is 0.25 [sec]×20=5.0 [sec]. As a result, the delay time at the end of the print job JOB3 is 1.0 [sec]−5.0 [sec]=−4.0 [sec]. The delay time at the end of the print job JOB3 is shorter than the second time [Td]. Therefore, the operation control section 101 returns the printing speed in the next print job JOB4 to the normal printing speed of 60 [sheets/min].

Also for the print job JOB4 and a print job JOB5, the operation control section 101 determines the printing speed in the same manner as described above and allows the printing section to perform the printing operation at the determined printing speed.

Figure 4:
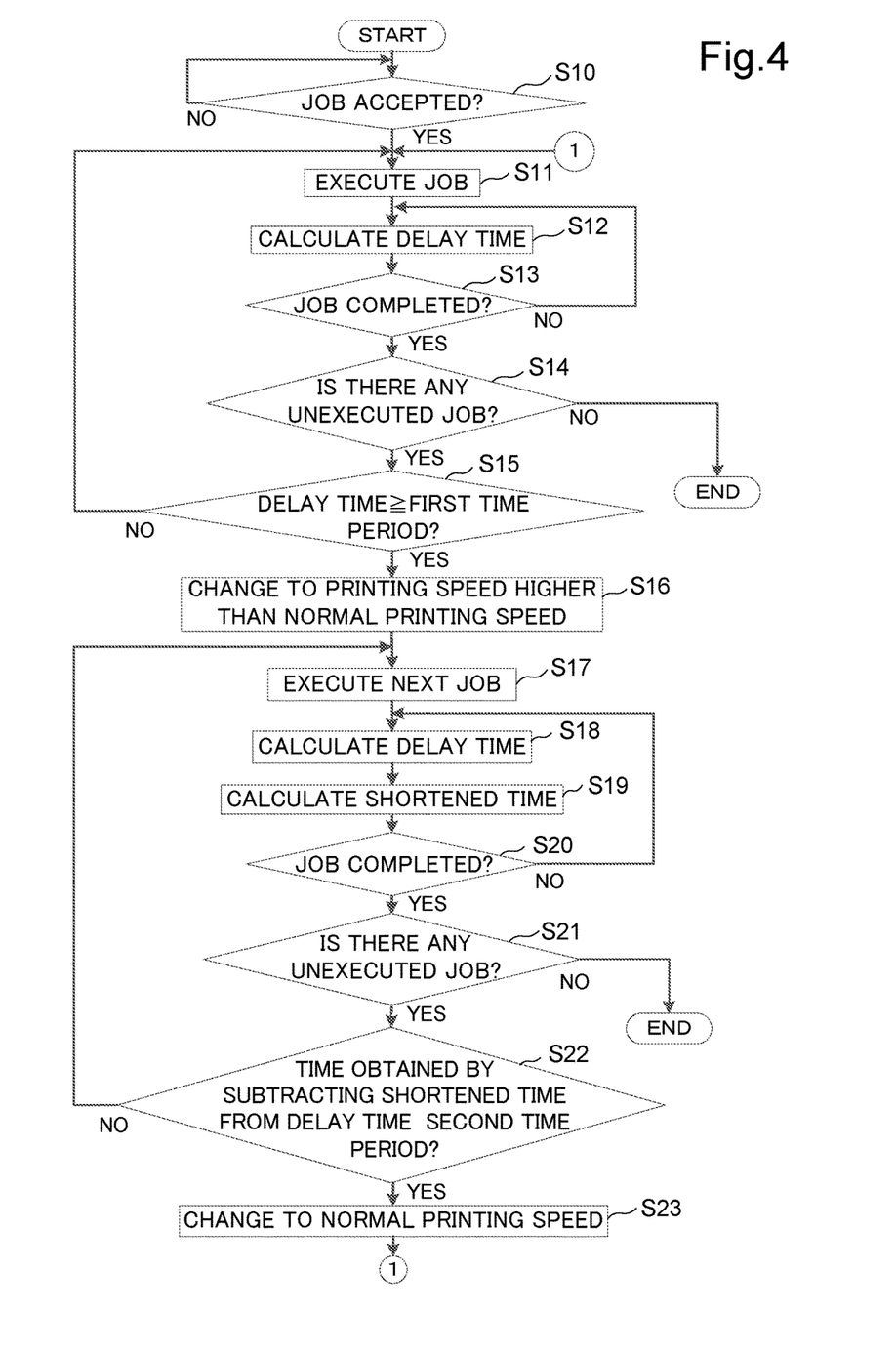
FIG. 4 is a flowchart showing an operation flow of the image forming apparatus according to the one embodiment of the present disclosure.

FIG. 4 is a flowchart showing an operation flow of the image forming apparatus 1 according to the one embodiment of the present disclosure. When the acceptance section 103 accepts print jobs (YES in step S10), the operation control section 101 sequentially executes the print jobs (step S11). In other words, the operation control section 101 allows the printing section to perform a printing operation at the normal printing speed [V1]. Furthermore, if the print job includes post-processing, such as stapling, the operation control section 101 allows the post-processing section 2 to perform a post-processing operation. Then, the delay time calculating section 102 calculates the delay time [Ta] to be generated by the execution of the print job (step S12). The calculation of the delay time in step S12 is repeated until the operation control section 101 completes one print job.

When the one print job is completed (YES in step S13), the operation control section 101 determines whether or not there is any unexecuted print job (step S14). If there is no unexecuted print job (NO in step S14), the operation control section 101 ends the processing. On the other hand, if there is any unexecuted print job (YES in step S14), the operation control section 101 determines whether or not the delay time [Ta] generated in the one print job is equal to or longer than the first time period [Tb] (step S15).

If the delay time [Ta] is neither equal to nor longer than the first time period [Tb] (NO in step S15), the operation control section 101 performs the processing in step S11. In other words, the operation control section 101 allows the printing section to perform a printing operation in the next print job, without changing the printing speed, at the normal printing speed [V1].

On the other hand, if the delay time [Ta] is equal to or longer than the first time period [Tb] (YES in step S15), the operation control section 101 changes the printing speed of the printing section to the printing speed [V2] higher than the normal printing speed [V1] (step S16). Then, the operation control section 101 allows the printing section to perform a printing operation in the next print job at the printing speed [V2] determined in the processing in step S16 (step S17).

After the processing in step S17, the delay time calculating section 102 calculates the delay time [Ta] to be generated by the execution of the print job (step S18). Furthermore, the delay time calculating section 102 calculates the shortened time [Tc] to be generated by the execution of the print job (step S19). The calculation of the delay time in step S18 and the calculation of the shortened time in step S19 are repeated until the operation control section 101 completes one print job.

When the one print job is completed (YES in step S20), the operation control section 101 determines whether or not there is any unexecuted print job (step S21). If there is no unexecuted print job (NO in step S21), the operation control section 101 ends the processing. On the other hand, if there is any unexecuted print job (YES in step S21), the operation control section 101 determines whether or not the time [Ta−Tc] obtained by subtracting the shortened time [Tc] from the delay time [Ta] is equal to or shorter than the second time period [Td] (step S22).

If the time [Ta−Tc] is neither equal to nor shorter than the second time period [Td] (NO in step S22), the operation control section 101 performs the processing in step S17. In other words, the operation control section 101 does not returns the printing speed to the normal printing speed [V1] and allows the printing section to perform a printing operation in the next print job at the printing speed [V2] determined in the processing in step S16.

On the other hand, if the time [Ta−Tc] is equal to or shorter than the second time period [Td] (YES in step S22), the operation control section 101 performs the processing in step S11. In other words, the operation control section 101 returns the printing speed to the normal printing speed [V1] and allows the printing section to perform a printing operation at the normal printing speed [V1] in the next print job.

There is known an image forming apparatus in which the printing speed can be changed based on information contained in an instruction entered by a user. It is conceivable to eliminate the delay time generated in one print job using this image forming apparatus. In this case, however, it is necessary for the user to determine the timing to change the printing speed with the understanding of the delay time generated in the image forming apparatus and it is difficult for a general user to appropriately determine the timing to change the printing speed.

In contrast, the image forming apparatus 1 according to the one embodiment of the present disclosure can eliminate the delay time in a printing process generated owing to post-processing, even without the need for the user to determine the timing to change the printing speed with the understanding of the delay time generated in the image forming apparatus 1 and enter the instruction to change the printing speed at the determined timing.

Furthermore, when the delay time is eliminated by increasing the printing speed, the control to allow the printing section to perform the printing operation at a printing speed higher than the normal printing speed is stopped and the printing section is allowed to perform the printing operation at the normal printing speed. Therefore, the rate at which each mechanism of the image forming apparatus deteriorates owing to wear or the like and the power and the operating sound involved in operating each mechanism can be reduced as much as possible.

The present disclosure is not limited to the above embodiment and can be modified in various ways.

<Modification 1>

The description in the above embodiment has been given of the case where the operation control section 101 determines, at the timing when one print job is completed, whether or not the delay time [Ta] calculated by the delay time calculating section 102 is equal to or longer than the first time period [Tb] and, if the delay time [Ta] is equal to or longer than the first time period [Tb], the operation control section 101 controls the printing section to perform a printing operation in the next print job at the printing speed [V2] higher than the normal printing speed [V1] (see steps S13 to S15 in FIG. 4). However, the present disclosure is not necessarily limited to this case. The operation control section 101 may determine whether or not the delay time [Ta] calculated by the delay time calculating section 102 is equal to or longer than the first time period [Tb], not at the timing when one print job is completed, but constantly (constant monitoring).

<Modification 2>

The description in the above embodiment has been given of the case where the operation control section 101 determines, at the timing when one print job is completed, whether or not the time [Ta−Tc] obtained by subtracting the shortened time [Tc] from the delay time [Ta] is equal to or shorter than the second time period [Td] and, if the time [Ta−Tc] is equal to or shorter than the second time period [Td], the operation control section 101 stops controlling the printing section to perform a printing operation at the printing speed [V2] higher than the normal printing speed [V1] and allows the printing section to perform a printing operation in the next print job at the normal printing speed [V1] (see steps S20 to S22 in FIG. 4). However, the present disclosure is not necessarily limited to this case. The operation control section 101 may determine whether or not the time [Ta−Tc] is equal to or shorter than the second time period [Td], not at the timing when one print job is completed, but constantly (constant monitoring).

<Modification 3>

When the delay time [Ta] is equal to or longer than the first time period [Tb] (YES in step S15 in FIG. 4), the display control section 104 may allow the display section 473 to display a notification screen notifying of the delay time [Ta] calculated by the delay time calculating section 102 and an instruction acceptance screen through which an instruction to allow or not to allow the printing section to perform the printing operation at the printing speed [V2] higher than the normal printing speed [V1] is accepted.

Figure 5:
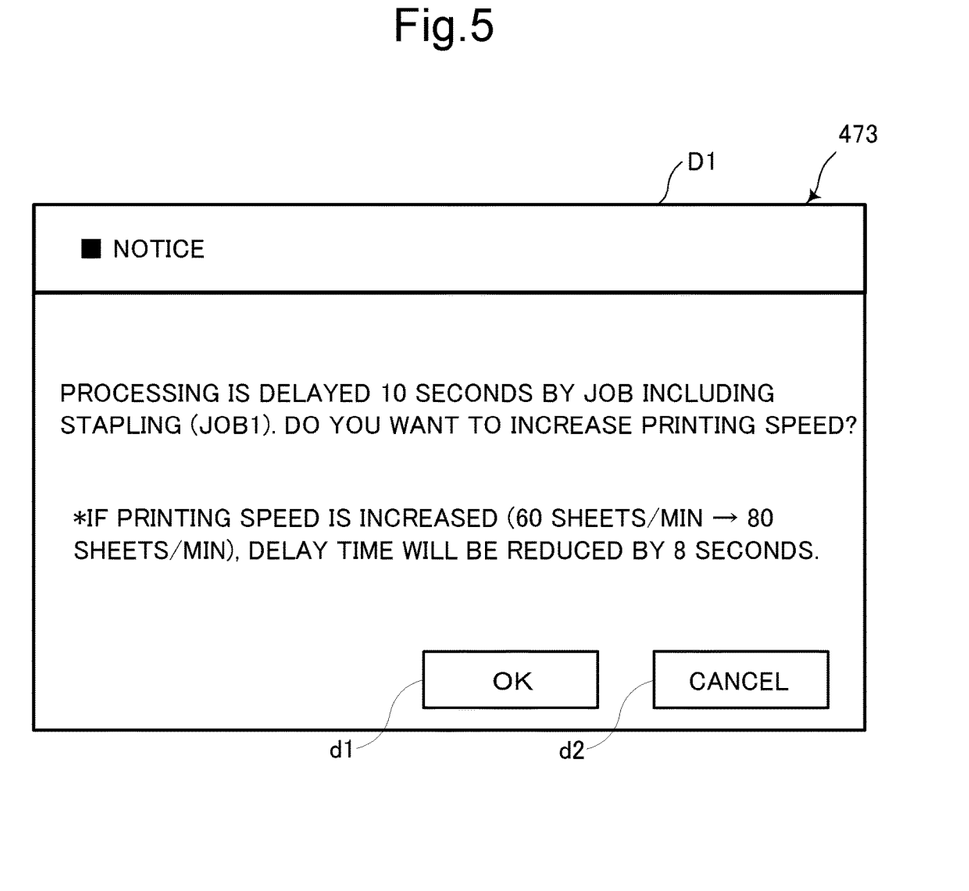
FIG. 5 shows an example of a display screen displayed on a display section of an image forming apparatus according to a modification of the present disclosure.

FIG. 5 shows an example of a display screen D1 displayed on the display section 473. In the example shown in FIG. 5, the display screen D1 not only serves as the above notification screen and instruction acceptance screen but also serves as a notification screen notifying of the delay time (shortened time) reduced by increasing the printing speed.

When a user presses a button d1 provided on the display screen D1, the acceptance section 103 accepts an instruction to allow the printing section to perform the printing operation at the printing speed [V2] higher than the normal printing speed [V1]. On the other hand, when a user presses a button d2 provided on the display screen D1, the acceptance section 103 accepts an instruction to allow the printing section to still perform the printing operation at the normal printing speed [V1]. When the acceptance section 103 accepts the instruction to allow the printing section to perform the printing operation at the printing speed [V2] higher than the normal printing speed [V1], the operation control section 101 controls the printing section to perform the printing operation at the printing speed [V2] higher than the normal printing speed [V1].

<Modification 4>

When the image forming apparatus 1 becomes unable to form an image, the delay time calculating section 102 may add a time depending upon the time taken for the image forming apparatus 1 to recover to become able to form the image to a delay time in a printing process to be generated by post-processing of the post-processing section 2 and calculate the time obtained by the addition as a delay time.

Here, the condition where the image forming apparatus 1 becomes unable to form an image refers to a condition where it has caused a jam (paper jam) or has run out of toner. In the event of a jam, in order that the image forming apparatus 1 recovers to become able to form an image, a user's work for clearing the jammed recording paper sheet P from the conveyance path 190 (jam clearing) is necessary. The delay time calculating section 102 calculates the time from the occurrence of a jam to the end of jam clearing (the time taken to clear a jam) as the time taken for the image forming apparatus 1 to recover to become able to form an image. On the other hand, in the event of out-of-toner, in order that the image forming apparatus 1 recovers to become able to form an image, a user's work for replacing toner is necessary. The delay time calculating section 102 calculates the time from the occurrence of out-of-toner to the end of toner replacement (the time taken to replace toner) as the time taken for the image forming apparatus 1 to recover to become able to form an image.

The delay time calculating section 102 multiplies the above-described time taken for the image forming apparatus 1 to recover to become able to form an image by a predetermined factor. For example, the delay time calculating section 102 multiplies the time taken to clear a jam by a predetermined factor "0.5". For another example, the delay time calculating section 102 multiplies the time taken to replace toner by a predetermined factor "0.1".

Then, the delay time calculating section 102 adds the time obtained by multiplying the time taken for the image forming apparatus to recover to become able to form an image by the predetermined factor to the delay time in the printing process to be generated by post-processing of the post-processing section 2. When the time obtained by the above addition is equal to or longer than a predetermined first time period, the operation control section 101 controls the printing section to perform the printing operation at a predetermined printing speed higher than the normal printing speed. Therefore, even if it takes time for a user to clear a jam or replace toner, the printing section can increase the printing speed to eliminate the delay time due to the jam clearing or the toner replacement, without user's entry of any instruction.

<Other Modifications>

The image forming apparatus control program described in the above embodiment and modifications may be one stored on a computer-readable non-transitory recording medium, such as a hard disk, a CD-ROM, a DVD-ROM, a semiconductor memory or so on.

Some of the configurations shown in the above embodiment and modifications may be combined.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
a printing section; and
a control unit, wherein the control unit implements:
an operation control section configured to control an operation of the printing section;
a post-processing section configured to perform post-processing of a recording paper sheet subjected to printing by the printing section; and
a delay time calculating section configured to calculate a delay time in a printing process to be generated by the post-processing performed by the post-processing section,
wherein when the delay time calculated by the delay time calculating section is equal to or longer than a predetermined first time period, the operation control section controls the printing section to perform a printing operation at a predetermined printing speed higher than a normal printing speed, when the operation control section controls the printing section to perform the printing operation at the printing speed higher than the normal printing speed, the delay time calculating section calculates a shortened time in the printing process to be generated by the control and subtracts the shortened time from the delay time, and if a time obtained by subtracting the shortened time from the delay time is equal to or shorter than a predetermined second time period, the operation control section stops controlling the printing section to perform the printing operation at the printing speed higher than the normal printing speed and allows the printing section to perform the printing operation at the normal printing speed.

2. The image forming apparatus according to claim 1, wherein the operation control section determines, at a timing when one print job is completed, whether or not the delay time calculated by the delay time calculating section is equal to or longer than the first time period and, if the delay time calculated by the delay time calculating section is equal to or longer than the first time period, the operation control section controls the printing section to perform a printing operation in a next print job at the printing speed higher than the normal printing speed.

3. The image forming apparatus according to claim 2, wherein the operation control section determines, at a timing when one print job is completed, whether or not the time obtained by subtracting the shortened time from the delay time is equal to or shorter than the second time period and, if the time obtained by subtracting the shortened time from the delay time is equal to or shorter than the second time period, the operation control section stops controlling the printing section to perform the printing operation at the printing speed higher than the normal printing speed and allows the printing section to perform a printing operation in a next print job at the normal printing speed.

4. The image forming apparatus according to claim 1, wherein when the image forming apparatus becomes unable to form an image, the delay time calculating section adds a time depending upon a time taken for the image forming apparatus to recover to become able to form the image to the delay time in the printing process to be generated by the post-processing of the post-processing section and calculates the time obtained by the addition as a delay time.

5. The image forming apparatus according to claim 4, wherein the delay time calculating section is further configured to calculate a time taken to clear a jam and/or a time taken to replace toner as the time taken for the image forming apparatus to recover to become able to form the image.

6. The image forming apparatus according to claim 1, wherein the delay time calculating section is further configured to calculate, as the delay time in the printing process, a delay time to be generated by making an interval between the recording paper sheets being fed longer than when the post-processing is not performed.

7. The image forming apparatus according to claim 1, wherein the operation control section is configured to change the printing speed by allowing the printing section to change a processing speed in the printing operation.

8. The image forming apparatus according to claim 1, wherein the operation control section is configured to change the printing speed by allowing the printing section to change an interval between the recording paper sheets being fed in a continuous printing operation.

9. An image forming apparatus comprising:
a printing section; and
a control unit, wherein the control unit implements:
an operation control section configured to control an operation of the printing section;
a post-processing section configured to perform post-processing of a recording paper sheet subjected to printing by the printing section; and
a delay time calculating section configured to calculate a delay time in a printing process to be generated by the post-processing performed by the post-processing section,
wherein when the delay time calculated by the delay time calculating section is equal to or longer than a predetermined first time period, the operation control section controls the printing section to perform a printing operation at a predetermined printing speed higher than a normal printing speed, and
when the image forming apparatus becomes unable to form an image, the delay time calculating section adds a time obtained by multiplying the time taken for the image forming apparatus to recover to become able to form the image by a predetermined factor to the delay time in the printing process to be generated by the post-processing of the post-processing section and calculates the time obtained by the addition as a delay time.

10. An image forming apparatus comprising:
a printing section; and
a control unit, wherein the control unit implements:
an operation control section configured to control an operation of the printing section;
a post-processing section configured to perform post-processing of a recording paper sheet subjected to printing by the printing section;
a delay time calculating section configured to calculate a delay time in a printing process to be generated by the post-processing performed by the post-processing section; and
a display section,
wherein when the delay time calculated by the delay time calculating section is equal to or longer than a predetermined first time period, the operation control section controls the printing section to perform a printing operation at a predetermined printing speed higher than a normal printing speed,
the control unit implements a display control section configured to control display of the display section, and an acceptance section configured to accept an instruction relating to printing,
when the delay time calculated by the delay time calculating section is equal to or longer than the first time period, the display control section allows the display section to display a notification screen notifying of the delay time calculated by the delay time calculating section and an instruction acceptance screen through which an instruction to allow or not to allow the printing section to perform the printing operation at the printing speed higher than the normal printing speed is accepted, and
when the acceptance section accepts an instruction to allow the printing speed to perform the printing operation at the printing speed higher than the normal printing speed, the operation control section controls the printing section to perform the printing operation at the printing speed higher than the normal printing speed.

* * * * *